Feb. 11, 1964

M. BRODSKY ETAL 3,120,994

METHOD OF PRODUCING A DOUBLE FLUORIDE OF
TETRAVALENT URANIUM AND OF AN
ALKALI-METAL CATION

Filed Feb. 11, 1959

INVENTORS
MICHEL BRODSKY
PIERRE PAGNY
BY Irwin S. Thompson
ATTY.

United States Patent Office 3,120,994
Patented Feb. 11, 1964

3,120,994
METHOD OF PRODUCING A DOUBLE FLUORIDE OF TETRAVALENT URANIUM AND OF AN ALKALI-METAL CATION
Michel Brodsky, St.-Germain-en-Laye, and Pierre Pagny, Villeneuve-la-Garenne, France, assignors to Potasse et Engrais Chimiques, Paris, France, a corporation
Filed Feb. 11, 1959, Ser. No. 792,524
Claims priority, application France Nov. 29, 1956
7 Claims. (Cl. 23—14.5)

This application is a continuation-in-part of our co-pending application Serial No. 695,008, filed on November 7, 1957.

The invention relates to a method of producing from uranium ore a double fluoride of uranium and of an alkali-metal or radical selected from the group consisting of sodium, potassium and ammonium.

This double fluoride may advantageously be transformed into uranium metal according to reactions known per se and comprising magnesio- or calcio-thermics.

In order to manufacture uranium on an industrial scale, the process now in use consists in preparing uranium tetrafluoride which is decomposed by magnesio- or calcio-thermics into uranium metal and the corresponding alkaline earth fluoride.

But the method for obtaining uranium fluoride comprises a large number of steps and a considerable consumption of reagents, making uranium very expensive to obtain.

In fact this process consists at first of attacking uranium ore with a mineral acid, such as nitric acid, which produces a solution of uranyl nitrate. After separating off the insoluble residues, the uranium concentration of the solution is increased, by means of the following successive operations:

The solution is treated with sodium carbonate, which enables the metallic hydroxides to be eliminated by filtration. The uranyl-carbonate complex is then broken up by nitric or sulphuric acid, and by adding caustic soda, sodium uranate is precipitated, and is separated off by filtration. This precipitate is dissolved by the nitric acid and a solution of uranyl nitrate is obtained with a stronger concentration of uranium than the reaction solution.

This concentrated solution is then purified by extraction with an organic solvent, after which it is treated with hydrogen dioxide so as to precipitate uranium peroxide, $UO_4$. This peroxide could not be precipitated in a dilute medium because of its solubility, which is by no means negligible. The peroxide is calcinated and thus transformed to hexavalent uranium tri-oxide $UO_3$, then reduced by hydrogen or ammonia to the tetravalent uranium dioxide state, $UO_2$, which in turn is then, by the addition of hydrofluoric acid gas, converted to uranium tetrafluoride $UF_4$.

It was hitherto not possible to prepare uranium from a double fluoride of uranium and of an alkali-metal or radical, because it was not known how to manage an easy mass production of this latter double fluoride.

In fact the previously known processes for obtaining such a double fluoride consisted in reducing uranyl nitrate with formic and hydrofluoric acids in the presence of potassium fluoride. But this reaction was only possible with a photochemical catalysis. Therefor the procedure followed, consisting in placing tubes on a roof of a building for utilizing solar irradiation was only suitable for laboratory experiments.

The present invention has for its purpose, while allowing an easy, speedy and cheap production of the double alkali and uranium fluoride, to simplify the production of uranium and hence to reduce its cost in a great extent.

As the reactions involved by this process concern reagents in solutions, i.e,. under a ionic form, it is to be understood that the wording "alkali" hereafter used includes as well alkali metals, sodium and potassium, as ammonium which, under a ionized state, is most generally considered as an alkali cation.

According to the invention, the method of producing a double fluoride of tetravalent uranium and of an alkali cation selected fom the group consisting of sodium, potassium and ammonium, comprises mixing a solution of a uranyl salt, selected from the group consisting of uranyl nitrate, sulphate and chloride, with formic acid and with a fluoride of an alkali cation selected from the group consisting of sodium, potassium and ammonium, hereby obtaining a solution, subsequently heating said solution to a temperature of about 90° C., and thereafter subjecting said heated solution to an injection of sulphur dioxide whereby a dense precipitate of a double fluoride of tetravalent uranium and of said alkali cation is formed.

As the double fluoride thus obtained is not soluble, and is easy to separate it from its mother-liquor, the invention applies therefor to solutions of uranyl salts having very low concentrations, such as those industrially obtained by treating with acids, ores of a low uranium content.

The equation of the process according to the invention is as follows:

(1) 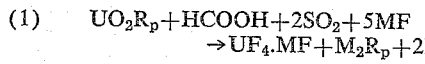
$$UO_2R_p + HCOOH + 2SO_2 + 5MF$$
$$\rightarrow UF_4 \cdot MF + M_2R_p + 2HMSO_3 + CO_2\uparrow$$

$R^-$ being one of the following anions: $NO_3^-$ or $Cl^-$ whereas $p=2$; or $SO_4^{--}$ whereas $p=1$ and $M^+$ being an alkali cation: $Na^+$, $K^+$ or $NH_4^+$.

For example with a uranyl nitrate and a potassium fluoride, Equation 1 reads as follows:

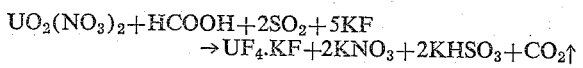
$$UO_2(NO_3)_2 + HCOOH + 2SO_2 + 5KF$$
$$\rightarrow UF_4 \cdot KF + 2KNO_3 + 2KHSO_3 + CO_2\uparrow$$

The reaction expressed by Equation 1 corresponds to a real combination process, according to the following intermediate steps, showing that formic acid does not behave as a direct reducing agent, but forms with sulphur dioxide, hydrosulphurous acid under a nascent form, which is the real reducing agent:

(a) 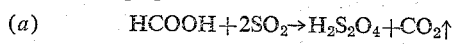
$$HCOOH + 2SO_2 \rightarrow H_2S_2O_4 + CO_2\uparrow$$

The hydrosulphurous acid reduces the $U^{VI}$ salt:

(b) 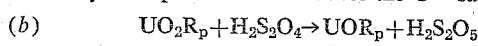
$$UO_2R_p + H_2S_2O_4 \rightarrow UOR_p + H_2S_2O_5$$

thus forming a $U^{IV}$ salt and pyrosulphurous acid.

But the $U^{IV}$ salt formed is very unstable and in the presence of the fluoride MF, it leads to a double fluoride of uranium and of the M cation:

(c) 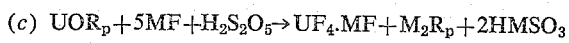
$$UOR_p + 5MF + H_2S_2O_5 \rightarrow UF_4 \cdot MF + M_2R_p + 2HMSO_3$$

The salt $UF_4 \cdot MF$ being very insoluble the reaction c is complete and consequently the other reactions. Adding a, b and c it leads to Equation 1.

It is noticeable that these reactions do not depend of solar irradiation and may perfectly be performed in closed containers which is an important feature for an industrial process.

When the double fluoride UF$_4$.MF is precipitated, it is possible to separate it by physical means such as decantation or filtration. The double salt being thereafter dried, it is possible to transform it directly into uranium metal by magnesio- or calcio-thermics according to the known reaction:

(2) $\quad UF_4.MF + 2\binom{Ca}{Mg} \rightarrow U + 2\binom{Ca}{Mg}F_2 + MF$

To that purpose the double fluoride is mixed with chips of calcium or magnesium, the reaction being triggered off by heating (for example by means of a filament brought to red heat by an electric current).

The Equation 2 applies for all meanings of the symbol M(NH$_4$, Na and K). But in the particular case where M=NH$_4$, it is possible to put into practice a slightly different process.

The double fluoride UF$_4$.NH$_4$F is first decomposed by heat:

(3) $\quad UF_4.NH_4F \rightarrow UF_4 + NH_4F$ and the uranium fluoride is submitted to the calcio- or magnesio-thermics:

(4) $\quad UF_4 + 2\binom{Ca}{Mg} \rightarrow U + 2\binom{Ca}{Mg}F_2$

A detailed embodiment of the invention will now be described by way of nonlimitative examples.

Figure 1:
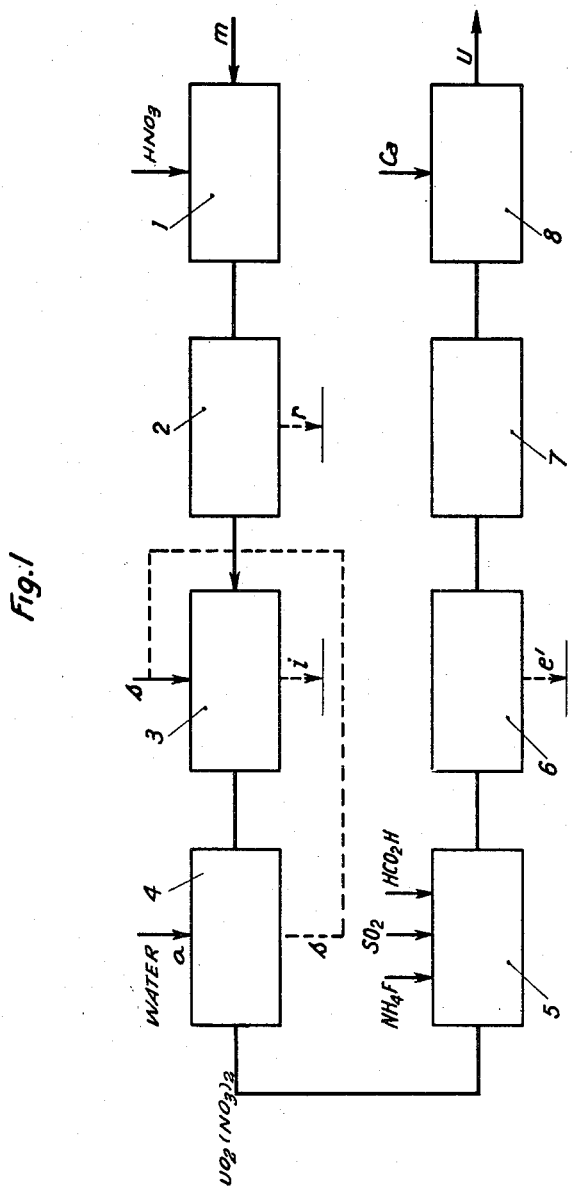
FIGURE 1 is a diagram representing the various operations constituting an embodiment of the invention.

According to said embodiment, a uranium ore, such as pitchblende or autunite, of which uranium content may be very low, is attacked with nitric acid, in order to form uranyl nitrate. This reaction is indicated by the rectangle 1 in the diagram, FIGURE 1, where $m$ indicates the ore. After separation off at 2 of the insoluble residues $r$ by filtration or equivalent means, the reaction solution, which may only have a small uranium content, is subjected at 3 to purification by means of a solvent $s$ which may be tributyl phosphate. This solvent dissolves the uranium selectively, and the uranium is reextracted from the solvent by water introduced at $a$, and the solvent coming from 4 is, as indicated by the dotted line, reintroduced at 3. The spent liquid practically free of uranyl nitrate is discharged at $i$.

To the solution of uranyl nitrate UO$_2$(NO$_3$)$_2$ are added at 5 ammonium fluoride NH$_4$F and formic acid HCOOH. The mass is then heated to about 90° C., and the sulphur dioxide, SO$_2$, bubbled in.

After a few minutes, a very dense green double precipitate of uranium and ammonium fluoride UF$_4$.NH$_4$F is formed, and collects in the bottom of the apparatus. This double fluoride is very easily separated from the solution and washed on a filter. The remaining solution contains ammonium nitrate NH$_4$NO$_3$ and ammonium bisulphite NH$_4$HSO$_3$. It does not contain more than a few milligrammes of uranium per litre, on account of the very low solubility of the double fluoride of uranium and ammonium. Carbon dioxide is given off.

The reaction may be written as follows:

(5) $\quad UO_2(NO_3)_2 + HCOOH + 2SO_2 + 5NH_4F$
$\rightarrow UF_4.NH_4F + 2NH_4NO_3 + 2NH_4HSO_3 + CO_2$ The double fluoride of uranium and ammonium, obtained at 5 in accordance with reaction (5), may then be treated so as to form uranium metal.

For this purpose the double fluoride is separated from its mother-liquor $e'$ at 6. The precipitate, washed and dried, is heated at 7 to approximately 250° C., in an inert, dry atmosphere (for example in a current of nitrogen) whereby the double fluoride is decomposed into uranium fluoride UF$_4$ and ammonium fluoride NH$_4$F.

The ammonium fluoride produced can be condensed by cooling and used in reaction (5).

The uranium fluoride is then mixed at 8 with calcium or magnesium chips, and after a preliminary heating it is converted into uranium metal.

Figure 2:
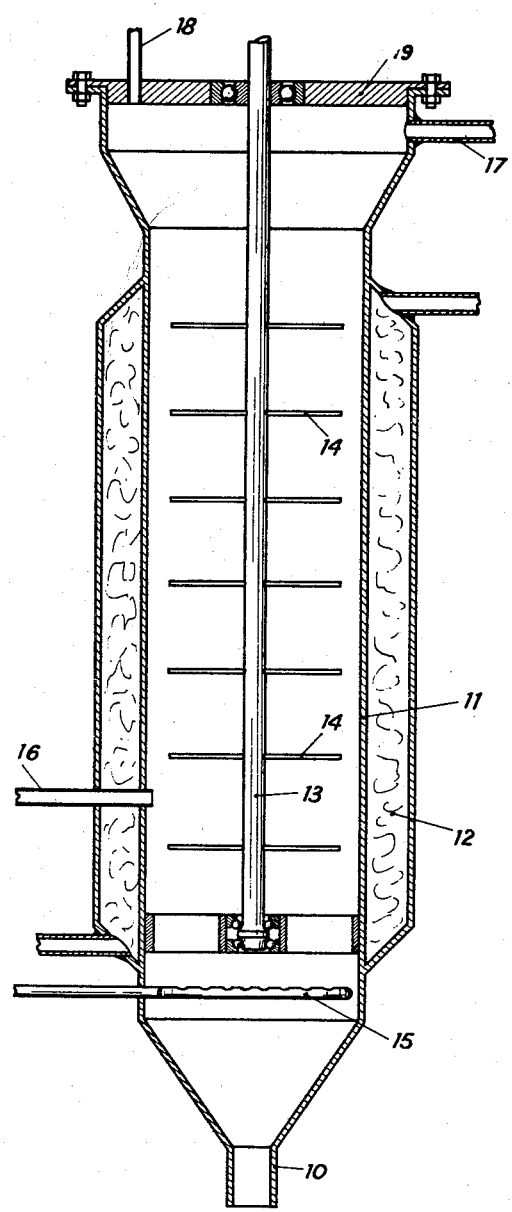
FIGURE 2 is a view in elevation with a section showing an appliance which might advantageously be used for converting a uranium salt.

In carrying out the reaction (5) above, there may advantageously be used a continuous apparatus of the type represented in FIGURE 2.

This apparatus comprises a cylindrical vessel 11 fitted with a double casing sleeve 12 heated by steam circulation. Inside the vessel 11 is arranged an agitator consisting of a vertical shaft 13 fitted with small radial bars 14 and driven with a continuous rotary motion.

Below the agitator a perforated circular conduit 15 is arranged to enable sulphur dioxide to be injected.

The solution of uranyl nitrate to which have been added formic acid and ammonium fluoride is introduced in the vessel 11 through a pipe 16.

The clear liquid comprising the ammonium nitrate and the ammonium bisulphite is evacuated through the pipe 17 in the upper part of the vessel 11.

The gaseous elements (carbon dioxide, water vapour, formic acid vapour) escape through the pipe 18 provided in the cover 19 of the apparatus.

The double fluoride of uranium and ammonium is collected at the bottom of the apparatus through the tube 10.

*Example No. 1.*—A solution consisting of 10.6 kilogrammes of uranyl nitrate (UO$_2$(NO$_3$)$_2$.6H$_2$O) and 1,000 kilogrammes of water is treated with 5 kilogrammes of ammonium fluoride and 3 kilogrammes of an aqueous solution of formic acid titering 90% HCOOH. After heating to about 90° C., sulphur dioxide is injected for 40 minutes. The precipitate is then collected, washed with water, and 8.2 kilogrammes of a moist precipitate is obtained, which after drying in a normal atmosphere at 120° C. yields 7.3 kilogrammes of the double fluoride of uranium and ammonium, in a dry state.

The remaining solution contains only 12 milligrammes of uranium per litre.

If it is desired to obtain in a single operation the uranium metal in accordance with reaction (2) above, 7.3 kilogrammes of the dry double fluoride are thoroughly mixed with 2.5 kilogrammes of calcium, using heat to initiate the reaction. This yields an ingot of uranium metal weighing 4.6 kilogrammes.

QUANTITATIVE EXAMPLES

*Example No. 2.*—To 400 litres of a solution of uranyl sulphate containing 20 kilogrammes of uranium in solution, there is added 600 litres of a solution of sodium fluoride obtained by dissolving 22.5 kilogrammes of pure sodium fluoride and previously clarified by means of a small press filter. The mixture of solution thus obtained is heated to 90° C. After addition of 12 kilogrammes of formic acid containing 90% of HCOOH the uraniferous solution is subjected to an injection of sulphurous gas during an hour. The suspension of double fluoride of tetravalent uranium and of sodium which is obtained is filtered by means of a vacuum filter. The green and crystalline precipitate set down on the filter is washed with distilled water. 58 kilogrammes of wet precipitate are obtained and after air drying at 120° C. the precipitate yields 29.5 kilogrammes of double fluoride of uranium and of sodium.

The filtrate of which pH is about 3.5 contains 27 milligrammes of uranium per litre.

*Example No. 3.*—1,000 litres of a solution of uranyl chloride and potassium fluoride containing 60 kilogrammes of uranium and 75 kilogrammes of potassium fluoride are heated at 90° C. and subjected to an injection of sulphurous gas. After addition of 36 kilogrammes of formic acid containing 90% of HCOOH, the precipitation of the green double salt takes place. The suspension is filtered after a reaction of one hour and half. There are obtained 115 kilogrammes of wet precipitate. After drying at 120° C. in presence of air 95 kilogrammes of anyhdrous double fluoride of uranium and potassium are obtained. The filtrate, pH of which is about 3.5, contains 25 milligrammes of uranium per litre.

*Example No. 4.*—1,000 litres of a clarified solution of uranyl sulphate containing 60 kilogrammes of uranium and 55 kilogrammes of ammonium fluoride are introduced into a vat and suitably stirred. The solution is heated up to 90° C. and subjected to an injection of sulphurous gas. After addition of 20 kilogrammes of formic acid containing 90% HCOOH, the precipitation of the double salt takes place. The suspension thus obtained is filtered after one hour of reaction and the precipitate is washed, with water. There are produced 98 kilogrammes of wet precipitate. After air drying at 120° C., 88.5 kilogrammes of anhydrous double fluoride of uranium and ammonium are obtained.

The filtrate of which pH is about 3.3 contains 35 milligrammes of uranium per litre.

*Example No. 5.*—To 400 litres of a solution of uranyl chloride containing 20 kilogrammes of dissolved uranium, there are added 600 litres of a solution of sodium fluoride obtained by dissolving 20.5 kilogrammes of pure sodium fluoride. After clarification of the solution thus produced, this solution is heated up to 90° C. and there are added 8 kilogrammes of formic acid containing 90% of HCOOH. The solution is then subjected to an injection of sulphurous gas during an hour. The suspension of double fluoride of tetravalent uranium and of sodium is filtered and the precipitate is washed with water on the filter. There are collected 47 kilogrammes of wet precipitate and after air drying at 110° C., 30.5 kilogrammes of double fluoride of uranium and sodium.

The filtrate contains about 16 milligrammes of uranium per litre.

*Example No. 6.*—1,000 litres of a solution of uranyl nitrate and of potasium fluoride containing 5 kilogrammes of uranium and 7.5 kilogrammes of potassium fluoride are heated at 90° C. and after addition of 3 kilogrammes of a solution of acid formic containing 90% HCOOH, they are subjected to an injection of sulphurous anhydride. The suspension of double fluoride of uranium and of potassium formed is filtered after an hour of reaction and the precipitate is washed with distilled water. 9.5 kilogrammes of wet precipitate are obtained and after air drying at 110° C., there is obtained 8.0 kilogrammes of double fluoride of uranium and potassium.

The filtrate contains 5 milligrammes of uranium per litre.

What we claim is:

1. A method of producing a double fluoride of tetravalent uranium and of an alkali cation selected from the group consisting of sodium, potassium and ammonium, said method comprising mixing a solution of a uranyl salt selected from the group consisting of uranyl nitrate, uranyl sulphate and uranyl chloride, with formic acid and with a fluoride of an alkali cation selected from the group consisting of sodium, potassium and ammonium, thereby forming a solution, subsequently heating said last mentioned solution to a temperature of about 90° C., thereafter subjecting said heated solution to an injection of sulphur dioxide, whereby a dense precipitate of a double fluoride of tetravalent uranium and of said alkali cation is formed.

2. A method of producing a double fluoride of tetravalent uranium and of an alkali cation selected from the group consisting of sodium, potassium and ammonium, said method comprising mixing a solution of a uranyl salt selected from the group consisting of uranyl nitrate, uranyl sulphate and uranyl chloride, with formic acid and with a fluoride of an alkali cation selected from the group consisting of sodium, potassium and ammonium, thereby forming a solution, subsequently heating said solution to a temperature of about 90° C., thereafter subjecting said heated solution to an injection of sulphur dioxide, whereby a dense precipitate of a double fluoride of tetravalent uranium and of said alkali cation is formed and physically separating said double fluoride precipitate from the remaining solution.

3. A method of producing a double fluoride of tetravalent uranium and of an alkali cation selected from the group consisting of sodium, potassium and ammonium, said method comprising mixing a solution of a uranyl salt selected from the group consisting of uranyl nitrate, uranyl sulphate and uranyl chloride with formic acid and a fluoride of an alkali cation selected from the group consisting of sodium, potassium and ammonium, thereby forming a solution, subsequently heating said last-mentioned solution to a temperature of about 90° C., thereafter subjecting said heated solution to a bubbling of gaseous sulphur dioxide and simultaneously agitating said bubbled in solution, whereby a dense precipitate of a double fluoride of tetravalent uranium and of said alkali cation is formed, and isolating said precipitate.

4. A method of producing a double fluoride of tetravalent uranium and of ammonium comprising mixing a solution selected from the group consisting of uranyl nitrate, uranyl sulphate and uranyl chloride with formic acid and with ammonium fluoride, thereby forming a solution, subsequently heating said last-mentioned solution to a temperature of about 90° C., thereafter subjecting said heated solution to a bubbling of gaseous sulphur dioxide and simultaneously agitating said bubbled in solution, whereby a dense precipitate of a double fluoride of tetravalent uranium and of ammonium is formed, and isolating said resulting precipitate.

5. In a method of producing a double fluoride of tetravalent uranium and of an alkali cation selected from the group consisting of sodium, potassium and ammonium, which comprises mixing a solution of a uranyl salt selected from the group consisting of uranyl nitrate and uranyl sulphate with formic acid and with a fluoride of said alkali cation thereby forming a solution, that improvement consisting of subsequently heating said last-mentioned solution to a temperature of about 90° C., and subjecting said heated solution to an injection by bubbling of gaseous sulphur dioxide, whereby a dense precipitate of said double fluoride of tetravalent uranium is formed.

6. In a method of producing a double fluoride of tetravalent uranium and of an alkali cation selected from the group consisting of sodium, potassium and ammonium, which comprises mixing a solution of a uranyl salt selected from the group consisting of uranyl nitrate and uranyl sulphate with formic acid and with a fluoride of said alkali cation thereby forming a solution, that improvement consisting of subsequently heating said last-mentioned solution to a temperature of about 90° C., thereafter subjecting said heated solution to a bubbling of gaseous sulphur dioxide, and simultaneously agitating said bubbled-in solution, whereby a dense precipitate of said double fluoride of tetravalent uranium is formed, and physically separating said double fluoride precipitate from the remaining solution.

7. In a method of producing a double fluoride of tetravalent uranium and of ammonium, which comprises mixing a solution of a uranyl salt selected from the group consisting of uranyl nitrate and uranyl sulphate with formic acid and with an ammonium fluoride, thereby forming a solution, that improvement consisting of subsequently heating said last-mentioned solution to a temperature of about 90° C., thereafter subjecting said heated solution to an injection of gaseous sulphur dioxide, whereby a dense precipitate of a double fluoride of tetravalent uranium and of ammonium is formed, and physically separating said precipitate from the remaining solution.

References Cited in the file of this patent

UNITED STATES PATENTS

| | | | |
|---|---|---|---|
| 1,826,806 | Marden | Oct. 13, | 1931 |
| 2,650,153 | Ellis | Aug. 25, | 1953 |
| 2,654,654 | Leah | Oct. 6, | 1953 |
| 2,768,059 | Bailes et al. | Oct. 23, | 1956 |
| 2,880,059 | Tolley | Mar. 31, | 1959 |

OTHER REFERENCES

Mellor: Comprehensive Treatise on Inorganic and Theoretical Chemistry, vol. 10, pp. 166–172 and 214 (1930), Longmans, Green & Co., London.

Meister: AEC Document MDDC–1673, pages 5, 9–11, Feb. 11, 1948.

Seaborg and Katz: "The Actinide Elements," NNES IV, 14A, pages 572, 573 (1954).